Nov. 21, 1961    G. R. E. WEAVER    3,009,409
CENTRIFUGAL FAN VENTILATORS
Filed Feb. 11, 1959    3 Sheets-Sheet 1

Inventor
G. R. E. Weaver
By Hancock Downing & Leebold
Attys

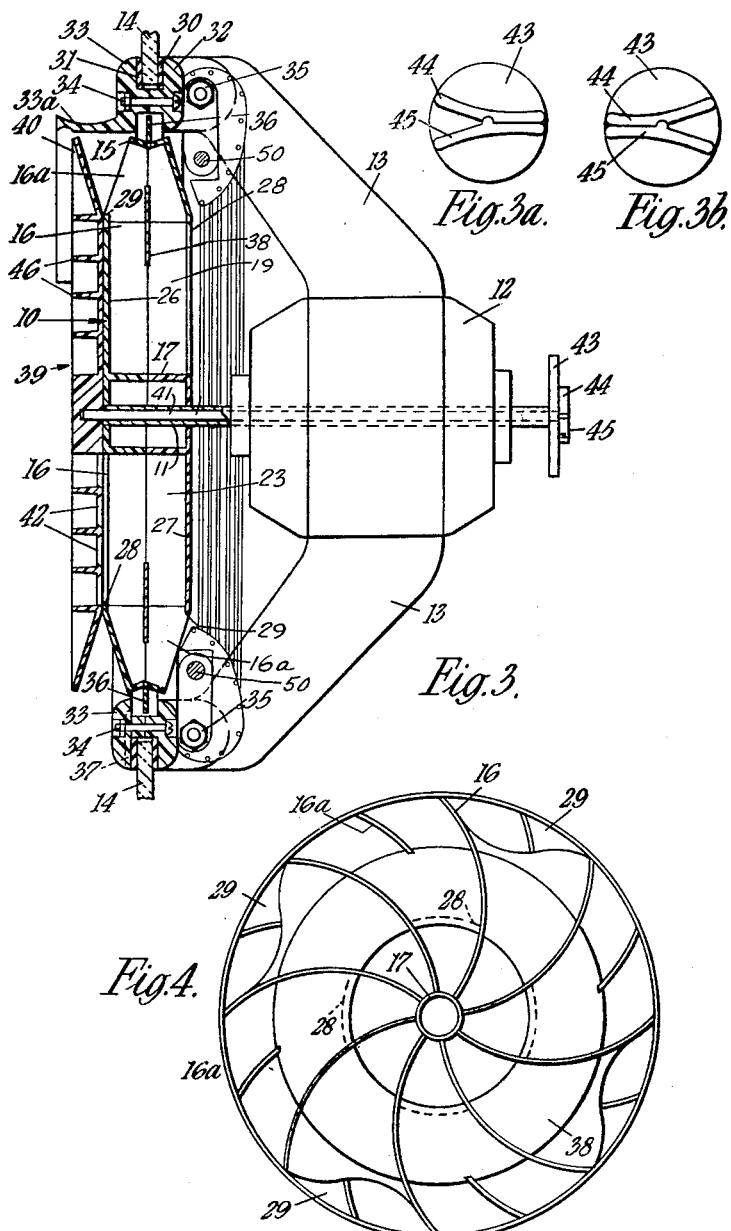

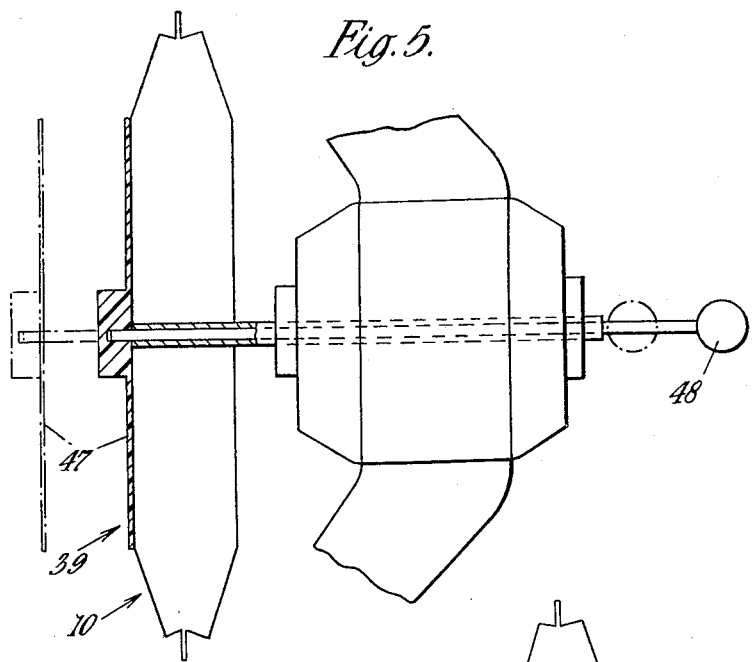
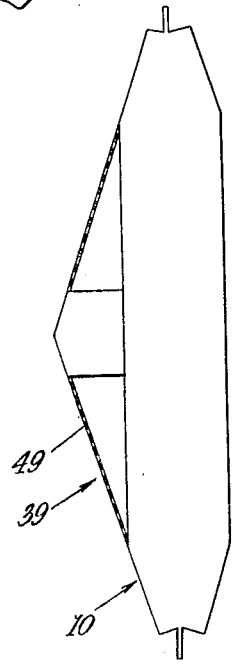

United States Patent Office 3,009,409
Patented Nov. 21, 1961

3,009,409
CENTRIFUGAL FAN VENTILATORS
Geoffrey R. E. Weaver, 33a Gerald Road,
Bournemouth, England
Filed Feb. 11, 1959, Ser. No. 792,503
Claims priority, application Great Britain Feb. 11, 1958
14 Claims. (Cl. 98—96)

This invention relates to centrifugal fan ventilators, particularly those intended for use with enclosed spaces such as rooms, offices, workshops and the like, where they can be readily fitted to apertures in windows, walls or other partitions.

An object of the present invention is to provide a centrifugal fan ventilator which delivers fresh air into the enclosed space and simultaneously extracts therefrom stale air, gas, fumes, smoke or the like (hereinafter referred to as fumes) without intermingling of the respective streams of fresh air and fumes within the ventilator.

Another object of the invention is to provide a centrifugal fan ventilator which provides efficient ventilation without causing draughts at door or window openings or the like.

The present invention consists in a centrifugal fan ventilator comprising a power driven rotor adapted to be fitted into an aperture in a window, wall or other partition, said rotor having blade means forming a plurality of compartments in the rotor, one or certain of the compartments each having an inlet aperture associated therewith adapted to draw in fresh air at one or the outer side of the rotor and an outlet aperture adapted to deliver said fresh air at the other or inner side of the rotor into an enclosed space, the remaining compartment or compartments each having an inlet aperture at said inner side of the rotor adapted to simultaneously draw in fumes from the enclosed space and an outlet aperture at said outer side of the rotor adapted to deliver said fumes to atmosphere.

In one form said blade means may comprise a plurality of radially extending partitions forming a series of sector-shaped compartments.

In the accompanying drawings:

FIGURE 3 is a sectional side elevation of the ventilator taken on the line 3—3 of FIGURE 2 and showing the ventilator mounted in an aperture in a window.

FIGURES 3a and 3b are end elevations of the control for the rain exclusion device shown in FIGURE 3.

FIGURE 4 is a front elevation of a ventilator with parts removed to show a modified form of blade construction.

FIGURE 5 is a diagrammatic side elevation similar to FIGURE 3, showing a modified form of rain exclusion device.

FIGURE 6 is a diagrammatic side elevation similar to FIGURE 5, showing another modified form of rain exclusion device.

Figure 1:
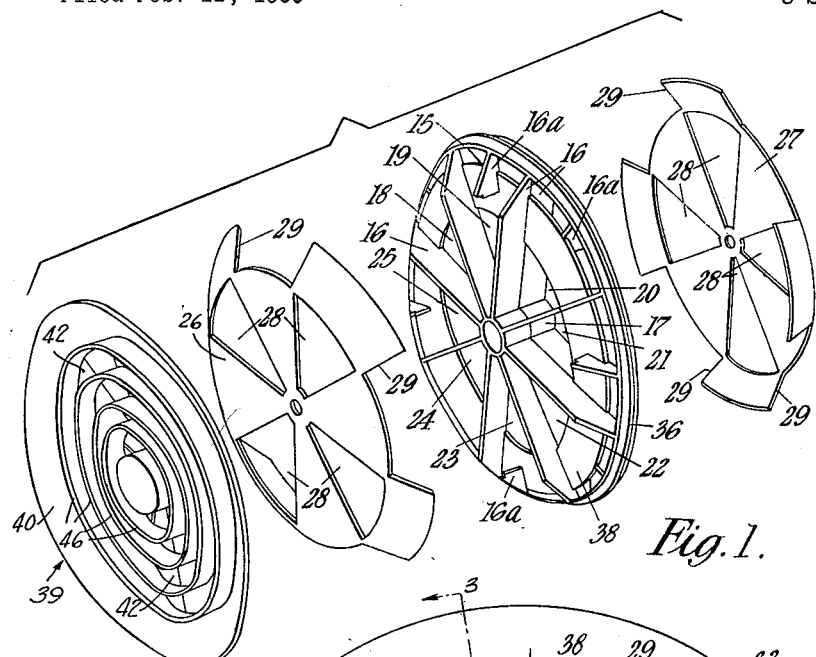
FIGURE 1 is a diagrammatic exploded view of the rotor assembly according to the present invention with the side discs removed, and rain exclusion device omitted for clarity.

In carrying the invention into effect according to one convenient mode, the ventilator comprises a bladed rotor assembly 10 mounted on and driven by a hollow shaft 11 of an electric motor 12, the latter having a plurality of support arms 13 for mounting the ventilator in an aperture in a window, wall or other partition 14 as will be described hereinafter.

The rotor 10 has a rim 15 and a plurality of radial blades or partitions 16 extending between the rim 15 and hub 17 of the rotor to form a series of sector-shaped compartments 18 to 25. The sides of the rotor are formed by discs 26 and 27, each having a series of inlet apertures 28 positioned adjacent the hub 17 and a series of exhaust apertures 29 positioned adjacent the rim 15 of the rotor. It will be appreciated that the exhaust apertures 29 instead of being formed wholly in the discs 26 and 27 may alternatively be positioned partially or wholly in the rim 15.

The inlet apertures 28 of the disc 26 are in communication with alternate compartments 18, 20, 22 and 24 and the exhaust apertures 29 thereof are in communication with the remaining alternate compartments 19, 21, 23 and 25, whilst the inlet apertures 28 of the disc 27 are in communication with the alternate compartments 19, 21, 23 and 25 and the exhaust apertures 29 thereof are in communication with the other alternate compartments 18, 20, 22 and 24. Thus, as clearly shown in FIGURE 1, the apertures of the discs 26 and 27 are so arranged in relation to one another that each inlet aperture 28 of the disc 26 is in communication with an exhaust aperture 29 of the disc 27 through its respective compartment and each inlet aperture 28 of the disc 27 is in communication with an exhaust aperture 29 of the disc 26 through its respective compartment.

The rotor may be made of a synthetic plastic material and although FIGURE 1, for clarity, shows the rotor body formed with separate side discs, it will be appreciated that it can conveniently be moulded in two parts i.e. each disc integrally formed with the rim, hub and each blade of half its final depth as clearly shown in FIGURE 3. This construction simplifies the inclusion of a light barrier disc 38 and rim flange 36 which will be described hereinafter.

Generally, the rotor is provided with an even number of compartments, with the inlet and exhaust apertures of adjacent compartments alternating between opposite sides of the rotor, but it will be appreciated that any convenient number of compartments from two upwards may be provided and that the blades or partitions may be curved as shown in FIGURE 4, instead of straight. Furthermore, one or more of the compartments may be provided with an additional booster blade or blades 16a as shown in FIGURES 1 to 4. Also, compartments drawing in fresh air or extracting fumes from the same side may be interconnected with one another if desired.

As shown in FIGURE 3, the aperture in the window 14 is provided with inner and outer sealing rings 30 and 31 associated respectively, with inner and outer clamping rings 32 and 33 which are secured together by fastening means 34. The inner clamping ring 32 has a plurality of apertured lugs 35 to which the support arms 15 of the motor are secured and the outer ring 33 has an outwardly extending arcuate flange or shield 33a which assists in preventing the passage of rain through the rotor.

The rim 15 of the rotor has an outwardly extending peripheral flange 36 which prevents the direct passage of rain and/or light over the rim of the rotor and the lower portion of the outer clamping ring 33 is provided with a slot or slots 37 for drainging any moisture which may collect between the clamping rings.

In operation, assuming the fan has been mounted in a window or external wall of a room with disc 26 externerally of the room and disc 27 internally of the room, rotation of the rotor causes compartments 18, 20, 22 and 24 to draw in fresh air axially through the inlet apertures 28 in the disc 26 and discharge same radially into the room through the exhaust apertures 29 in the disc 27, whilst the compartments 19, 21, 23 and 25 simultaneously draw in fumes axially from the room through the inlet apertures 28 in the disc 27 and discharge same radially to atmosphere through the exhaust apertures 29 in the disc 26. Thus, the assembly operates simultaneously as an intake and exhaust fan without intermingling of the fresh air and fumes within the ventilator. A circumferentially arranged heating element 50 may be associated with the rotor to warm incoming air during cold weather.

So that the ventilator can be used to ventilate an enclosed space where the direct passage of light is undesirable, for example a photographic dark room, a light barrier disc 38 is positioned in the rotor substantially parallel to and in spaced relation, to the discs 26 and 27. The disc 38 is mounted in apertures in the blades 16 as clearly shown in FIGURE 3 and may also serve to increase the strength of the rotor without unduly affecting the efficiency thereof.

Figure 2:
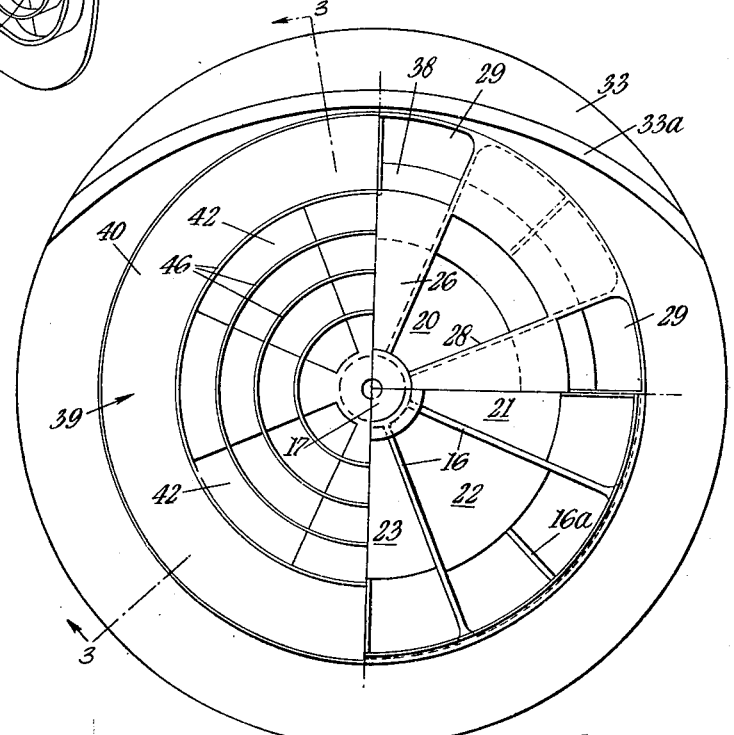
FIGURE 2 is a front elevation showing the ventilator with portions removed for clarity.

Referring now to FIGURES 2 and 3, the ventilator has an external rain exclusion device 39 which comprises a dish-shaped shutter 40 secured to a spindle 41 passing through the hollow motor shaft 11. The shutter 40 is provided with a plurality of apertures 42 corresponding in number, and of similar size and shape to the inlet apertures 28 of the rotor 10 and is capable of limited rotation relative to the rotor so that its operation is similar to the well-known hit-and-miss type of ventilator.

The spindle 41 is in frictional engagement with the motor shaft 11 and the latter terminates in a disc 43 having a protruding arcuately shaped manual control member 44. The shutter spindle 41 terminates in a protruding arcuately shaped manual control member 45 which co-operates with the control member 44 as shown in FIGURES 3a and 3b. With the control members 44 and 45 set in the position shown in FIGURE 3a the apertures 42 in the shutter 40 are coincident with the inlet apertures 28 in the rotor 10 and the assembly operates as an intake and extractor ventilator. With the control members 44 and 45 set in the position shown in FIGURE 3b, the shutter 40 obstructs the inlet apertures 28 of the rotor and the assembly operates as an extractor ventilator only. It will be appreciated that the shutter may be in either position irrespective of whether the ventilator is operating or not.

The shutter 40 is provided with a plurality of concentric vanes 46 which assist in preventing the entry of rain when the shutter apertures are coincident with the inlet apertures in the rotor and also serve to strengthen the shutter to minimise the possibility of distortion.

As an alternative or in addition to the frictional engagement of the shutter spindle 41 with the motor shaft 11, there may be provided spring or magnetic means for maintaining the relative disposition of the shutter 40 and the rotor 10 in either of the positions in which they may be manually set by the control members as shown in FIGURES 3a and 3b. For this purpose the control members 44 and 45 each comprise permanent magnets positioned with their respective north and south poles opposite each other so that the magnetic attraction serves to retain them in their set position.

FIGURE 5 shows a modified form of rain exclusion device 39 which comprises a plate member 47 secured to a spindle 41 as described above. In this embodiment the spindle 41 is mounted for longitudinal movement within the motor shaft 11 and is provided at its inner extremity with a control knob 48. With the latter in its innermost position the plate member 47 is spaced from the rotor 10 so that the assembly operates as an intake and extractor ventilator. When the control knob 48 is pulled to its outermost position the plate member 47 obstructs the inlet apertures 28 of the rotor and the assembly operates as an extractor ventilator only. As referred to above frictional spring and/or magnetic means may be provided to maintain the relative disposition of the plate member 47 and the rotor 10 in either of the positions in which they may be manually set by the control members.

FIGURE 6 shows another modified form of rain exclusion device 39 which comprises a perforated cone 49 mounted on the rotor 10 and covering the inlet apertures 28 thereof. In this embodiment any rain striking the cone 49 whilst the ventilator is in operation is thrown off by centrifugal force.

I claim:

1. A centrifugal fan ventilator adapted to be fitted into an aperture in a window, wall, or other partition, having means for mounting the ventilator in said aperture, and a power driven rotor, the rotor of said fan ventilator comprising a hub member and first and second side closure discs mounted on said hub member, a rim member encircling the peripheries of said closure discs, said rotor having a plurality of generally radial blades, each blade extending between said closure discs and between said rim and hub members to form compartments in the rotor, alternate compartments having an inlet aperture in said first closure disc near said hub member adapted to draw in fresh air at one side of the rotor and an outlet aperture in said second closure disc adjacent said rim adapted to deliver said fresh air at the other side of the rotor, the remaining compartments each having an inlet aperture in said second closure disc near said hub member adapted to simultaneously draw fumes from the other side of said rotor and an outlet aperture in said first closure disc at said one side of the rotor, whereby said fan continuously and concurrently blows air from each side thereof toward the other side thereof.

2. A ventilator as claimed in claim 1, wherein said blade means comprise a plurality of straight partitions extending between the rim and hub members of the rotor.

3. A ventilator as claimed in claim 1, wherein said blade means comprise a plurality of curved partitions extending between the rim and hub members of the rotor.

4. A ventilator as claimed in claim 1, wherein an annular light barrier plate is mounted between the blade means and positioned substantially parallel to and in spaced relation to said side closure discs and so positioned as to prevent the direct passage of light through said rotor.

5. A ventilator as claimed in claim 1, wherein a plurality of the compartments are provided with at least one additional generally radial booster blade extending inwardly from said rim and terminating short of said hub member.

6. A ventilator as claimed in claim 1, wherein the rotor is provided with an outwardly extending peripheral flange mounted on said means for mounting the assembly in an aperture in a window or the like, said peripheral flange preventing the direct passage of rain or light over the rotor.

7. A ventilator as claimed in claim 6, wherein said mounting means include inner and outer clamping rings, the upper portion of the outer clamping ring having an outwardly extending arcuate flange which assists in preventing the passage of rain through the rotor.

8. A centrifugal fan ventilator comprising a fan support means adapted to be fitted into an aperture in a window, wall or other partition, a power driven fan rotor mounted for rotation in said support means, said rotor having opposite sides, air inlet apertures in each side thereof, outlet apertures corresponding to each said inlet apertures in the side remote from each said inlet aperture, and disc rain exclusion means mounted on said support means over said apertures to prevent the passage of rain through the rotor.

9. A ventilator as claimed in claim 8, wherein said rain exclusion means comprises a shutter disc having apertures therein and mounted in co-axial relationship with said rotor and control means for imparting a limited rotative movement to said shutter disc relative to said rotor to bring the shutter apertures into and out of registry with the rotor inlet apertures as required.

10. A ventilator as claimed in claim 9, wherein said shutter disc is provided with a plurality of concentric vanes which assist in preventing the entry of rain when the shutter apertures are coincident with the rotor inlet apertures.

11. A ventilator as claimed in claim 8, wherein said rain exclusion means comprises a plate member mounted in co-axial relationship with said rotor and control means for moving said plate member axially in relation to said rotor to obstruct or clear the rotor inlet apertures as required.

12. A ventilator as claimed in claim 11, wherein said rain exclusion means comprises perforated means mounted to rotate with the rotor, the arrangement being such that rain striking the perforated means is thrown off by centrifugal force.

13. A ventilator as claimed in claim 12, wherein said perforated means is cone-shaped.

14. A ventilator as claimed in claim 1, wherein an outwardly extending peripheral flange is mounted on the rim of said rotor, said flange being positioned in a circumferential recess in the means for mounting the assembly in an aperture in a window or the like, the peripheral flange and circumferential recess preventing the direct passage of rain or light over the rotor.

References Cited in the file of this patent

UNITED STATES PATENTS

| | | |
|---|---|---|
| 1,303,802 | Kansky | May 13, 1919 |
| 1,487,828 | Ziganek | Mar. 25, 1924 |
| 2,152,614 | Younger | Mar. 28, 1939 |

FOREIGN PATENTS

| | | |
|---|---|---|
| 852,127 | France | Jan. 24, 1940 |